United States Patent [19]
Stevenson

[11] Patent Number: 6,024,534
[45] Date of Patent: Feb. 15, 2000

[54] METHOD TO CONVERT A SMALL BALE AGRICULTURAL STACK WAGON TO A BIG BALE AGRICULTURAL STACK WAGON

[76] Inventor: Lynn E. Stevenson, Box 100, Fairfield, Id. 83327

[21] Appl. No.: 08/753,875

[22] Filed: Dec. 2, 1996

[51] Int. Cl.$^7$ .................................................. B65G 57/32
[52] U.S. Cl. .......................................... 414/800; 414/111
[58] Field of Search ................................. 414/111, 24.5, 414/798.2, 798.5

[56] References Cited

U.S. PATENT DOCUMENTS

| | | | |
|---|---|---|---|
| 3,521,762 | 7/1970 | Walters | 414/111 |
| 4,534,691 | 8/1985 | Miguel | 414/111 |
| 5,405,229 | 4/1995 | Tilley et al. | 414/111 |
| 5,695,311 | 12/1997 | Miguel et al. | 414/111 |
| 5,697,758 | 12/1997 | Tilley | 414/111 |

*Primary Examiner*—Christopher P. Ellis
*Assistant Examiner*—Gregory A. Morse

[57] ABSTRACT

Apparatus for modifying conventional automatic three table bale wagons handling small bales to load, transport, and stack big bales with dimensions in excess of 3 feet×4 feet×8 feet. With the apparatus a modified bale wagon picks up and handles big bales during traversal of a field in which big bales of vegetative material have been deposited. The modified bale wagon with its apparatus loads the big bales one at a time and orders them without rotation, two at a time, on a loading table of a conventional three table automatic bale wagon which pivots vertically, placing the two big bales on end on the bale wagon load bed side-by-side in the bale wagon load bed. When the load bed reaches capacity, six to eight big bales, the bale wagon is driven to a storage area where the load bed pivots 90°, allowing the big bales to be pushed off the load bed, forming a compact stack of six to eight big bales.

1 Claim, 2 Drawing Sheets

METHOD TO CONVERT A SMALL BALE AGRICULTURAL STACK WAGON TO A BIG BALE AGRICULTURAL STACK WAGON

BACKGROUND AND SUMMARY OF THE INVENTION

One conventional automatic three table small bale wagon which received widespread commercial acceptance is the three table bale wagon illustrated in U.S. Pat. No. 2,848,127, issued on Aug. 19, 1958 in the name of Gordon E. Grey. Other small bale wagons of the same general type utilizing varying approaches to the same problem are shown in U.S. Pat. No. 4,370,796, issued Feb. 1, 1983, in the name of Leon W. Wilson; U.S. Pat. No. 4,273,488, issued in the name of Amos G. Hill, et al.; and U.S. Pat. No. 3,942,651, issued Mar. 9, 1976 in the name of Allen B. Neely, Jr. The improvements in conventional automatic three table small bale wagons are illustrated, for example, in U.S. Pat. No. 3,395,814, issued Aug. 6, 1968, in the name of Gordon E. Grey; U.S. Pat. No. 3,942,652, issued Mar. 8, 1976 in the name of L. Dennis Buller, et al.; U.S. Pat. No. 3,927,771, issued Dec. 23, 1975 in the name of Lee D. Buller, et al.; U.S. Pat. No. 4,203,695, issued May 20, 1980 in the name of Edward J. Wynn, et al.; U.S. Pat. No. 4,204,792, issued May 27, 1980 in the name of Edward J. Wynn, et al.; U.S. Pat. No. 4,088,231, issued May 9, 1978 in the name of Randall E. Zpser, et al.; and U.S. Pat. No. 5,547,334, issued Aug. 20, 1996 in the name of Albert F. Baril. The conventional automatic three table small bale wagons all load, handle, transport and stack small bales ranging in size from 14"×23"×36" to 16"×18"×46", with weights variable, depending on moisture content and type of vegetative material.

Recent developments in the field of agriculture have resulted in the use of balers to form big bales in the order of 3 feet×4 feet×8 feet or 4 feet×4 feet×8 feet, weighing between 1,000 lbs. and 2,200 lbs. (hereinafter "big bale") depending on the moisture content and type of vegetative material. The big bales are considered a more efficient and economical way of handling cut hay and straw. One big bale is equal in weight to 16 to 24 small bales. Big bales produce a more compact, weather-tight stack than do conventional bales. Big bales also make more efficient and compact loads when shipping. The big bales require less twine or baling wire than do a comparable volume of conventional bales.

One conventional automatic three table small bale wagon has achieved wide spread commercial acceptance, is the three table wagon illustrated in U.S. Pat. No. 2,848,127 issued on Aug. 19, 1958, in the name of Gordon Grey. Other such small bale wagons of the same general type utilizing varying approaches to the same problem are shown in U.S. Pat. No. 4,370,796, issued Jun. 16, 1981, in the name of Amos G. Hill, et al., U.S. Pat. No. 3,942,651, issued Mar. 9, 1976, in the name of Allen B. Neely, Jr., and U.S. Pat. No. 5,547,334 issued Aug. 14, 1995, in the name of Albert F. Baril. The conventional automatic three table small bale wagons are either self-propelled or drawn by a vehicle.

The above mentioned Grey type bale wagon has a first table for receiving bales from a bale loader or pickup assembly (hereinafter referred to as "first table"). The first table accumulates a predetermined number of bales, for example two, in a traverse row. An adjacent second table (hereinafter referred to as "second table") successively receives rows of bales from the first table and accumulates a plurality of such rows, for example four, five or six rows. This plurality of rows is commonly referred to as a tier of bales. The third table, or load bed (hereinafter referred to as "load bed"), successively receives the tiers from the second table and accumulates a plurality of such tiers, for example seven, to form a stack of bales in a block shaped configuration. Once a stack of this nature has been formed on the third table, it may be either transported or unloaded. In the case of the latter, the load bed is pivoted to an upright position for depositing the stack on the ground with the first tier of bales that was formed on the second table becoming the lowermost tier in contact with the ground and the last formed tier being the uppermost or top tier of the stack.

The above mentioned three table small bale stack wagon is modified to pick up, load, transport and stack big bales. In this invention, the first table is rendered inoperable in an upright position and remains static. The bale loader or pickup assembly transports and deposits big bales on the second table. The second table is modified and reinforced to accumulate a predetermined number of bales, for example two, in a traverse row and successively receive and order rows of bales from the pickup assembly. The second table accumulate or deposits a plurality of such rows, for example four, five or six rows on the third table or load bed. A row is commonly referred to as a tier of big bales. The third table or load bed successively receives the tiers from the second table and accumulates a plurality of such tiers, for example seven, to form a stack of bales in a block shaped configuration. Once a stack of this nature has been formed on the third table, it may be either transported or unloaded. In the case of the latter, the load bed is pivoted to an upright position for depositing the stack on the ground with the first tier of bales that was formed on the second table becoming the lowermost tier in contact with the ground and the last formed tier being the uppermost or top tier of the stack.

Despite the efficiency of using big bales in agriculture the cost of acquiring a big bale wagon to handle big bales such as illustrated and described in U.S. Pat. No. 4,534,691, issued Aug. 13, 1965, in the name of Marvin E. Miguel assigned to J. A. Freeman & Sons is substantial. The present invention allows the modification of three table small bale stack wagons like the Grey type, including the self-propelled conventional automatic three table small bale wagon, for example, including New Holland automatic self-propelled small bale wagons into a big bale stack wagon at a fraction of the cost of a new big bale wagon like the Freeman bale wagon.

A general object of the invention is to provide an method to convert a small bale stack wagon which may be operated by a single person and which will load, order and off-load big bales of hay.

Another object of the instant invention is to provide an small bale wagon which will arrange big bales of hay in a compact, weather-tight stack.

A further object of the instant invention is to provide an apparatus small bale wagon which will arrange big bales of hay in a stable stack.

A further object of the instant invention involves a method of converting conventional automatic small bale stack wagons manufactured by New Holland North America, Inc. (New Holland) having a hauling capacity of at least five (5) tons to load, transport and stack big bales.

A further object of the instant invention involves reinforcing the second table of said small bale stack wagon to handle and order large bales.

A further object is to modify said small bale stack wagons to have having a hauling capacity of at least five (5) tons to load, transport and stack big bales.

A further object of the instant invention is the modification of three table small bale stack wagons into a big bale stack wagon which will load, order form a stack and unload a compact stack of big bales.

Various other objects and advantages which are attained by the invention will become more fully apparent as the description which follows is read in conjunction with the accompanying drawings.

A preferred embodiment of the instant invention is a method to modify a small bale stack wagon enabling it to load, handle, transport, and stack big bales. One person with the use of the apparatus modifying a conventional three table small bale stack wagon can pick up big bales in the field, load it into the bale wagon and transport the big bales to a stacking site and unload six to eight big bales comprising up to six tons of hay.

Thus, while preferred apparatus in which the principles of the present invention are readily carried out as shown and described above, it is to be understood that the invention is not to be limited to the particular apparatus shown and described above, but that, in fact, widely different means may be employed in the practice of the invention.

DESCRIPTION OF THE PREFERRED EMBODIMENT

Figure 1:
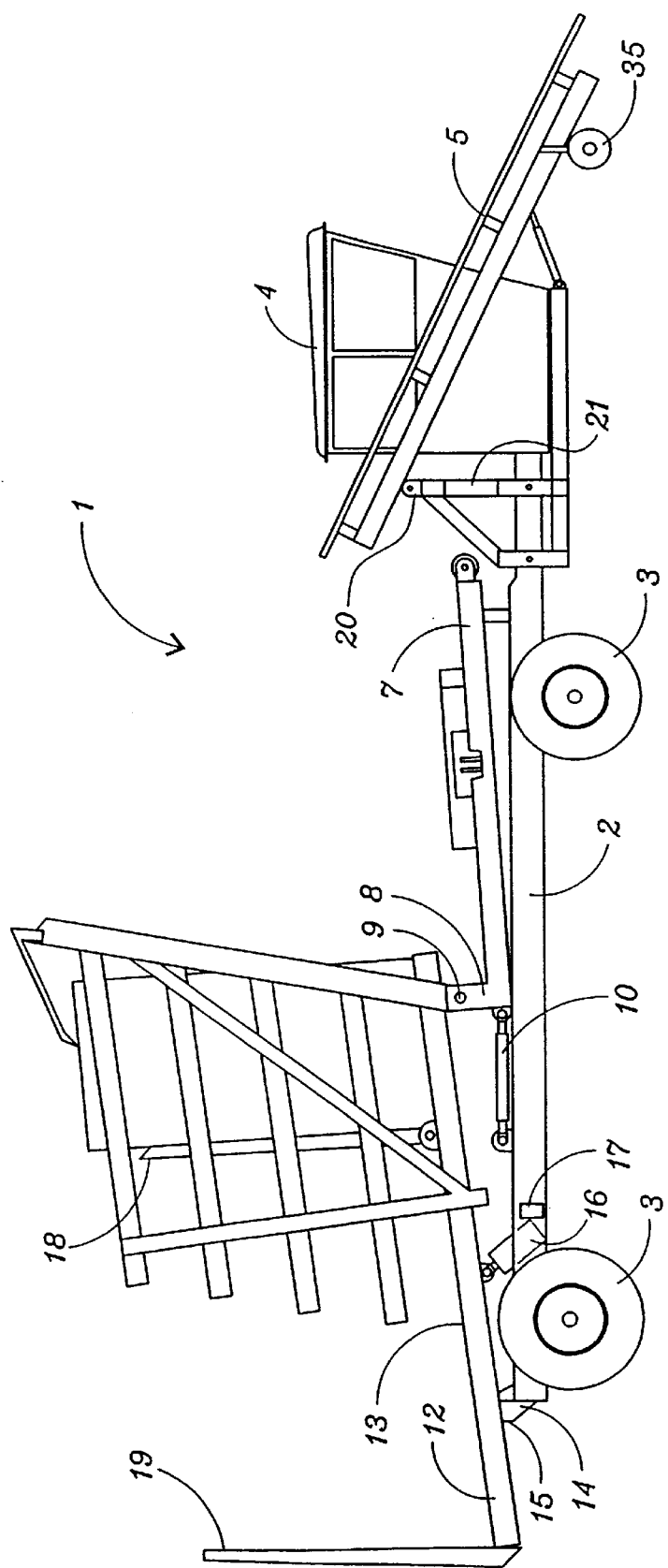
FIG. 1 Profile of three table small bale stack wagon
Figure 2:
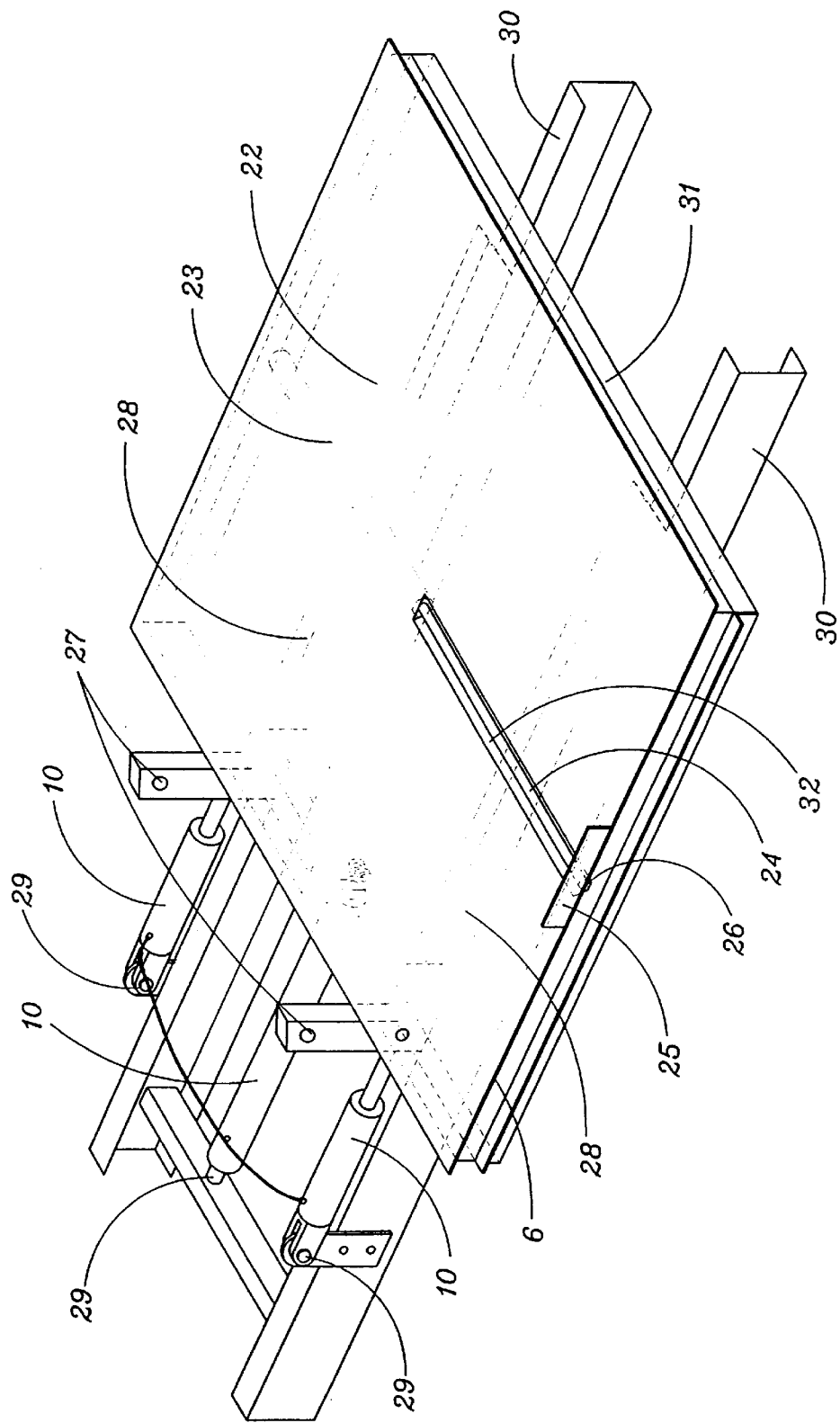
FIG. 2 Plan view of modified second table.

By way of explanation to understand the preferred embodiment of the invention, the following first part is a description of the function of the prior art of a small bale stack wagon.

Three table small bale stack wagons FIG. 1 (hereinafter in this section "three table small bale stack wagon", have a mobile chassis formed of left and right longitudinally extending channels 2 (only the right channel being shown), suitably interconnected by spaced traverse channels (not shown), and front and rear pairs of wheels 3, only right wheels of each pair being shown in FIG. 1, for movably supporting the interconnected channels 2. On the forward ends of the channels 2 is mounted a cab 4 for housing the operator and various controls for the wagon. A source of power, such as an engine, is suitable mounted on the chassis for driving, preferable, the rear pair of wheels 3.

The above-mentioned small bale stack wagon has a first table for receiving bales from a bale loader and accumulates a predetermined number of small bales. An adjacent second table successively receives rows of bales from the first table and accumulates a plurality of rows. The third table or load bed successively receives tiers of small bales from the second table to form a stack of bales.

An L-shaped member (hereinafter referred to as "L-shaped member") having a forwardly extending leg portion 7 which extends across the bottom surface of the second table upon which bales are supported and formed into a tier and an upwardly extending rear leg portion 8 which is pivotally secured at 9 and mounted on longitudinal channels 2. Three hydraulic cylinders 10 are pivotally secured at their anchor end to a frame member 2 and mounted between longitudinal channels 12. The rod end of hydraulic cylinders 5, 10 are pivotally secured to the free end of second table 6.

When second table 6,31 is in its normal horizontal tier-forming position, as shown in FIG. 1, it rests at its forward end on a transverse support member, not shown, fixed to front bracket 11. The requisite number of bales are accumulated and formed on second table 6,31 in a suitable manner. Subsequent to tier formation, the three hydraulic cylinders 10 are actuated so that they extend and cause said table 6,31 to swing upwardly about pivot point 9 to a generally vertical position adjacent the front end of a rearwardly disposed load bed, or third table, being generally indicated by referenced numeral 12. The tier of bales formed on second table 6,31 is then transferred to load bed 12.

Load bed 12 includes a platform assembly 13 which is pivotally mounted at 14 between spaced apart upstanding rear brackets 15 (only the right one being shown in FIG. 1) mounted on longitudinal channels 2. A pair of spaced apart hydraulic cylinders 16 (only the right one being shown) are pivotally secured at their anchor ends to transverse frame member 17 fixed between channels 2 and at their rod ends to platform assembly 13. When load bed 12 is in its generally horizontal tier-receiving position, it rests at its forward end on upstanding brackets. A stack of bales is formed on load bed 12 upon successive delivery thereto of tiers of bales by pivotal movement of second table 6,31 from its normal horizontal tier-forming position of FIG. 1 to its generally upright position adjacent the forward end of load bed 12.

As the tiers of bales are delivered to load bed 12, a rolling rack 18 supports the rear of the stack being formed. Rolling rack 18 moves rearwardly along the load bed against residual holding pressure of a hydraulic cylinder. While rolling rack 18 is held by hydraulic pressure at the position to which it has been moved along load bed 12, the pressure of the rolling rack cylinder is overcome with the delivery of each successive tier of bales from second table 6 to the front end of load bed 12 whereby rolling rack 18 is urged rearwardly one bale width at a time until rack 18 reaches its rear position. A desired number of tiers for forming a stack configuration dictates the rear position of load bed 12. The structure and function of rolling rack 18 and its hydraulic cylinder are illustrated and described in detail in U.S. Pat. No. 3,927,771.

When load bed 12 has been loaded with a desired number of tiers, stack transfer is initiated by extension of hydraulic cylinders 16. This causes load bed to pivot about point 14 from its generally horizontal position of FIG. 1 to an upright position in which rolling rack 18 and upright support tines 19 are disposed adjacent the ground. Referring now in this part to the drawing for a more detailed description of the method and apparatus capable of carrying out the preferred embodiment of the present invention.

A more particular discussion of the preferred embodiment of the invention is as follows: A bale loader mounted on the right side forward end of the bale wagon chassis is a conveyor 5. Conveyor 5 includes a means for hydraulically raising the forward end when the vehicle is operated on a highway or at anytime when the vehicle is operated at a speed greater than that which is used for picking up bales out of a field. The entire conveyor 5 pivots at the rearward mounting member 20. The forward end of the conveyor when in the lowered position rests on a pair of pneumatic wheels which keep the front of the conveyor from digging into the ground and at the proper height to receive bales. A hydraulic motor and a shaft mounted gear box provide power for the two chains on the conveyor. Plural U-shaped dogs are fixed to the chain conveyors for picking up and transporting a bale from a position on the ground to the second table 6. The forward shaft of the chain conveyor has steel paddles attached parallel to the shaft so that upon engagement the bale is lifted onto the conveyor. The aft end of conveyor 5 and hydraulic motor are supported by a welded tubular steel frame that is bolted to the chassis 2,30 of the three table small bale stack wagon. The first table is rendered inoperable and is in a static, upright position.

Mounted to the top of a second table in a three table small bale stack wagon is a loading table of sufficient size and predetermined length and breadth to handle big bales 6, 22. The loading table comprises a floor, forward and rear ends, and opposed sides. The loading table is affixed to said second table and moves in concert with the second table whereby the loading table orders and forms the tiers of big bales in pairs.

Mounted to the loading table is a hydraulic mechanism having the means to move a big bale deposited on the loading table from the right side to the left side of the loading table. The hydraulic mechanism comprises a hydraulic cylinder 23 and has a rod of sufficient size to reach to the right side loading table 6, 22. The hydraulic cylinder barrel 23 is mounted at the midpoint of and perpendicular to the left side of the loading table. The hydraulic cylinder rod 24 is of sufficient length which extends to reach the right side of said loading table. Attached to the end of the hydraulic rod is a steel plate 25 of sufficient size to pull a big bale across the second table ordering the left side of said big bale parallel to the left side of the loading table.

The floor of the loading table contains a rectangular opening of predetermined length and breadth to accommodate the retraction and extension of said hydraulic rod with plate attached 26. The rectangular opening is a recessed channel in the loading table floor with said channel having opposing sides and a floor of predetermined length and breadth to accommodate the rod plate pulling device.

The loading table 22 pivots 90° from a horizontal resting position 6 to a vertical position to load a tier of bales into the load bed. To accommodate the weight of big bales, hydraulic cylinders are pivotally attached to the L-shaped members 8, 28 supporting the second table frame and to the top of and parallel to chassis frame of the three small bale stack wagon with one hydraulic cylinder attached to each chassis frame member 29.

In summary, the most important advantages, explicit and implicit, of the method described herein is the formation of a weather resistant stack of big bale bales in a simple and effective configuration by utilizing in a new and unique manner prior art stacking apparatus, one example of which is illustrated. Thus, while the preferred apparatus and method in which the principles of the present invention are readily carried out is shown and described above, it is to be understood that the invention is not to be limited to the particular apparatus shown and described above, but, in fact, widely different means may be employed in the practice of this invention.

What is claimed is:

1. A method for modifying three table small bale stack wagons designed to load, transport, and stack small bales into a bale stack wagon that loads, transports, and stacks big bales comprising the steps of:

a. detaching from said three table small bale stack wagon a conveyor having means for picking up said small bales from the ground and transporting small bales to a discharge end of the conveyor;

b. rendering inoperative a first table of said three table small bale stack wagon and fixing said first table in an upright position, whereby said first table is in a static vertical position;

c. mounting operatively a big bale conveyor apparatus on the right forward end of said three table small bale stack wagon chassis having conveyor means for picking up big bales from the ground and transporting big bales to a discharge end of said conveyor;

d. mounting operatively a wheel apparatus to forward end of said conveyor having means for supporting said big bale conveyor apparatus;

e. mounting operatively an automatic hydraulic means for raising and lowering said big bale conveyor apparatus;

f. mounting to a second table of said three table small bale stack wagon reinforcing means for strengthening said first table with predetermined materials to mount a table apparatus adapted to handle big bales;

g. mounting a table apparatus on the topside of a second table of said three table small bale stack wagon having means to receive and transfer big bales to a load bed of said small bale stack wagon;

h. installing operatively a lateral big bale pulling means of predetermined size for ordering and accumulating big bales in a pair side by side on said table apparatus having their longitudinal axis extending in a fore and aft direction relative to the direction of their transfer on the said load bed, whereby the lateral pulling means orders said big bales two at a time horizontally on the said table apparatus with the longitudinal axis of said big bales parallel to the three table small bale stack wagon chassis by pulling said big bales from the right side of said load table to the left side; and i. mounting a predetermined hydraulic means for raising and lowering said table apparatus loaded with said big bales to underside of said second table of said three table small bale stack wagon, whereby two big bales can be raised vertically on end and ordered on to a load bed of said small bale stack wagon and arranged for transport and stacking.

* * * * *